United States Patent [19]

Rössert et al.

[11] 4,340,688

[45] Jul. 20, 1982

[54] PROCESS FOR THE PREPARATION OF MALEINATE OILS

[75] Inventors: Michael Rössert, Unterschleissheim; Rolf Dhein, Krefeld, both of Fed. Rep. of Germany

[73] Assignee: Bayer Aktiengesellschaft, Leverkusen, Fed. Rep. of Germany

[21] Appl. No.: 250,589

[22] Filed: Apr. 3, 1981

[30] Foreign Application Priority Data

Apr. 12, 1980 [DE] Fed. Rep. of Germany ....... 3014106

[51] Int. Cl.³ ............................................. C08F 279/02
[52] U.S. Cl. .................................... 525/256; 525/285

[58] Field of Search ....................... 525/256, 282, 285

[56] References Cited

U.S. PATENT DOCUMENTS

| | | | |
|---|---|---|---|
| 3,527,736 | 9/1970 | Averink | 525/282 |
| 4,080,493 | 3/1978 | Yasui | 525/256 |
| 4,137,282 | 1/1979 | Otsuki | 525/285 |

Primary Examiner—Paul R. Michl
Attorney, Agent, or Firm—Connolly and Hutz

[57] ABSTRACT

Particular maleimides work as gel-inhibitors during the addition reaction of maleic anhydride and diene polymers.

9 Claims, No Drawings

PROCESS FOR THE PREPARATION OF MALEINATE OILS

The present invention relates to a process for the preparation of maleinate oils with a low gel content using N-substituted maleimides.

For many years, diene polymers have been included among the important raw materials for lacquer binders. Synthetic polybutadiene, polyisoprene and polycyclopentadiene resins and combinations thereof with natural unsaturated oils, fatty acids, phenolic resins or vinyl compounds have thus been reacted with maleic anhydride (Japanese published specification No. 46-954).

Intermediate products for the preparation of alkyd resins (Japanese published specification No. 46-21-193) and of water-soluble binders (Japanese published specification No. 46-7269) can be obtained in this way. German Offenlegungsschriften Nos. 20 16 223 and 20 38 768 relate to polybutadiene oil/maleic anhydride adducts for anodic electro-dip lacquering. To obtain cathodic electro-dip lacquers, maleinised olefin polymers are subsequently reacted with diamines containing a primary and a tertiary amino group (German Offenlegungsschrift No. 27 28 470).

The addition of maleic anhydride to olefin polymers is usually carried out with heating. Radical cross-linking, which leads to an increase in viscosity and to the risk of premature gel-formation takes place to a greater or lesser extent as a subsidiary reaction. The problem of controlling viscosity and the desire to avoid quality-impairing gel particles have, in the past, led to the use of gel-inhibitors. Cyclic ethers, aldehydes or ketones (Japanese published specification No. 48-3547), amides (Japanese published specification No. 48-3544), pyrocatechols (Japanese Offenlegungsschrift No. 50-7895), naphthols (Japanese Offenlegungsschrift No. 50-87 491), and phenothiazines (Japanese Offenlegungsschrift No. 49-132 013), for example, are recommended for this purpose. Japanese Auslegeschrift No. 43-26 870 describes the addition of maleic anhydride to polybutadienes at 50° C. in the presence of copper compounds, Japanese Auslegeschrift No. 47-44 557 describes the use of a complex forming agent such as, for example, acetyl acetone, and, finally, German Offenlegungsschrift No. 26 47 854 recommends the addition of imidazoles, thiazoles, metal salts of mercaptothiazoles, urea derivatives, naphthyl amines, nitroso amines, iron and compounds thereof, chlorides, bromides, iodides, hydrogen chloride, hydrogen bromide, hydrogen iodide, alkyl metal halides, halogenated hydrocarbons, alkinyl halides, chlorinated or brominated ketones and halogenated allyl compounds.

It has now surprisingly been found that even small quantities of basic maleimides or the salts thereof act as gel-inhibitors during the reaction of maleic anhydride and diene polymers and are superior to all compounds which have already been recommended for this purpose.

The invention relates to a process for the addition of maleic anhydride to diene polymers having a viscosity of from 400 to 50,000 cP (measured at 30° C.) in the presence of at least one gel-inhibitor, characterised in that a compound is used as gel inhibitor corresponding to the formula:

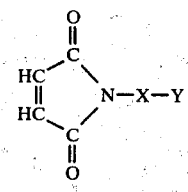

wherein
X represents a divalent aliphatic, cycloaliphatic, aliphatic-cycloaliphatic, aromatic or aliphatic-aromatic moiety containing from 1 to 12, preferably from 2 to 10 carbon atoms;
Y represents an amino group corresponding to the formula $NR^1R^2$ or an ammonium group corresponding to the formula:

$$N^{\oplus}R^1R^2R^3 \; Z^{\ominus}$$

$R^1$, $R^2$ each represents an alkyl group containing from 1 to 6, preferably from 1 to 4 carbon atoms; or
$R^1$ and $R^2$ together represent an alkylene radical containing from 2 to 6, preferably from 3 to 5 carbon atoms which can additionally also contain a hetero atom from the series comprising N,S,O,
$R^3$ represents a hydrogen atom, an alkyl group or aralkyl group containing from 1 to 18 carbon atoms or the group $CH_2-CO-NH_2$,
$Z^{\ominus}$ represents a monovalent anion, preferably a bicarbonate, tetrafluoroborate, formate, acetate, propionate, butyrate, lactate, halide, in particular chloride, bromide, iodide, a methylsulphate anion or
$R^3$ and $Z^{\ominus}$ together represent a group corresponding to the formulae $(CH_2)_n\text{-}SO_3^{\ominus}$ or $(CH_2)_m\text{-}CO_2^{\ominus}$ and
n and m represent integers from 2 to 6, preferably 3 or 4.

Preferred gel inhibitors include compounds corresponding to the above formula, wherein
X represents $(X^1)_p\text{—}(X^2)_q\text{—}(X^3)_r$
$X^1,X^2,X^3$ represent an alkylene group or a carbocyclic group, preferably
$X^1,X^3$ an alkylene group and
$X^2$ a carbocyclic group, and
p,q,r represent 0 or 1.

Particularly preferred gel-inhibitors include compounds corresponding to the above formula, wherein the —X—Y group has the following meaning:

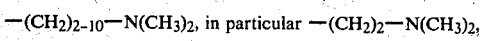

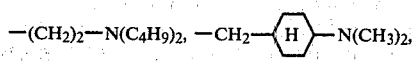

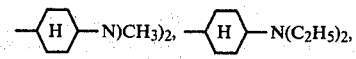

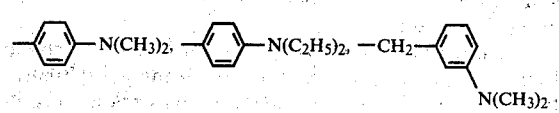

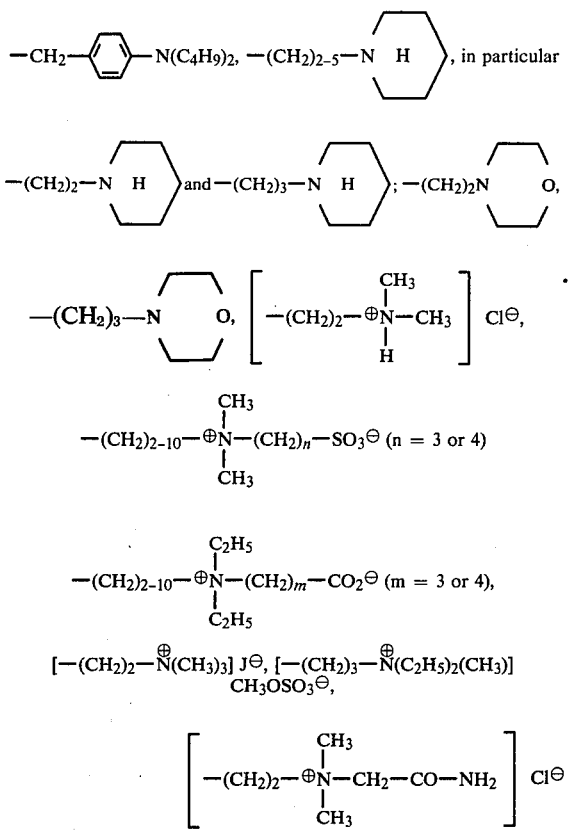

Preferred diene polymers in the context of the present invention include homo and copolymers of dienes such as butadiene-1,3, isoprene, cyclopentadiene, methylcyclopentadiene, chloroprene, 2,3-dimethylbutadiene-1,3 as well as copolymers of these dienes with other mixed polymerisable compounds wherein the copolymers should each contain at least 20%, preferably at least 50% by weight of condensed groups of dienes. "Other mixed-polymerisable compounds" are preferably styrene, α-methylstyrene, (meth)acrylic acid esters, vinyl esters, for example vinyl acetate, and also unsaturated fatty acids and unsaturated oils, for example linseed oil, soya oil, wood oil, safflower oil, castor oil, dehydrated castor oil, cottonseed oil, tall oil, the fatty acids of these oils and products obtained by conjugation or isomerisation of these fatty acids and oils.

The diene polymers can contain optional proportions of cis-, trans-, vinyl- or 3,4-structure. When using lower molecular butadiene/styrene or isoprene/styrene copolymers, it is advantageous if these copolymers contain in polymerised form at most 40% by weight styrene groups. The diene polymers, which are preferably liquid, can be prepared by conventional methods, for example according to U.S. Pat. No. 34 28 699.

The diene polymers used for the reaction with maleic anhydride generally have average molecular weights of from 500 to 15,000.

If desired, the reaction of the diene polymers with the other copolymerisable compounds can also take place simultaneously with the addition of maleic anhydride as a one-pot reaction.

In order to effect the addition of maleic anhydride to the diene polymers in the presence of the gel inhibitor, the reactants can be introduced in any optional order, for example simultaneously, into a reaction vessel and then reacted with each other at from 60° C. to 230° C., preferably 170° C. to 210° C. until the reaction is complete, preferably for from 1 to 10 hours. In practice, it has often proved to be advantageous to take the diene polymer and the gel-inhibitor and to allow them to stand for up to 20 hours at from 10° C. to 270° C. and thereafter to introduce the maleic anhydride and to heat it, preferably under an inert gas atmosphere. As the adduct is formed almost quantitatively, it is generally unnecessary to recover unreacted starting components.

The maleic anhydride content in the adduct is preferably from 2 to 70%, in particular from 8 to 25% by weight, based on the adduct.

The gel-inhibitor can be used in a quantity of from 0.001 to 20% by weight, preferably from 0.005 to 0.5% by weight, based on the diene polymer which is reacted with maleic anhydride and used as it is or in the form of its solution in an organic solvent.

The addition reaction of maleic acid anhydride to the liquid diene polymer is usually carried out in the absence of organic solvents, but it can also be carried out in the presence of such solvents. Examples of suitable solvents include aliphatic hydrocarbons such as liquid paraffin, n-paraffins and petroleum ether, alicyclic hydrocarbons such as cyclohexane and isopropylcyclohexane, aromatic hydrocarbons such as benzene, toluene and xylene as well as esters such as ethyl acetate or butyl acetate. Ketones such as acetone or methyl ethyl ketone and cyclic ethers such as dioxane can also be used.

The air-drying properties of the maleic anhydride adducts produced according to the invention can be accelerated considerably by addition of conventional dryers such as cobalt naphthenate. In order to cure the coatings produced from them, polyols, polymercaptans, polyamines or polyphenols can be added to the coating agents.

The gel-inhibitors used according to the invention have various advantages over the known gel-inhibitors. For example, they reduce the viscosity of the reaction mixture in an adequate and satisfactory manner, even when used in small quantities. Furthermore, their main advantage is that they react with the polymers themselves and thus cannot diffuse from the film.

In addition, the N-substituted maleimides used act not only as gel-inhibitors, but surprisingly also as reaction accelerators.

The maleic anhydride/diene polymer adducts produced according to the invention are suitable as raw materials for water-dilutable binders, for example anodic- or cathodic electro-dip binders and alkyd resins.

The percentages given in the following Examples are percentages by weight.

EXAMPLES

Course of maleinisation of polyol soya oil reaction products, 1. without gel inhibitor;
2. with 0.38%, based on the reaction product of soya oil with polybutadiene oil, N-(N',N'-diethylaminopropyl)-maleimide; and
3. with 0.143%, based on the reaction product of soya oil with polybutadiene oil, of a 50% solution of copper napthenate (copper content 10%) in mineral spirit (boiling point 140°/190° C.).

| Reaction Time at 180° C. | Viscosity corresponds to an outflow time (measured as a 50% solution in xylene according to DIN 53 211, DIN-Cup 4) of MIXTURE | | |
|---|---|---|---|
| | 1 | 2 | 3 |
| 0 | 23 sec | 18 sec | 19 sec |
| 2 h 20 min | gels after 1 h | 23 sec$^x$ | 29 sec$^x$ |
| 4 h 20 min | — | 28 sec$^y$ | 38 sec$^x$ |
| 11 h 30 min | — | 75 sec$^y$ | 60 sec$^y$ |

$^x$Maleic acid anhydride can be detected ($^1$H—NMR)
$^y$Maleic acid anhydride can no longer be detected.

| Acid numbers (Final Values): | | |
|---|---|---|
| Example | 2 | 3 |
| Semi-ester acid number | 52 | 61 |
| Total acid number | 78 | 111 |
| Anhydride acid number | 88 | 100 |

Method

To:
467 g of a reaction product of
1521 g polybutadiene oil (1,4-cis-polybutadiene oil with a viscosity of 9 poise (at 20° C.), an iodine number of 450 and a colour number of 10) and
503 g soya oil
with a viscosity corresponding to an outflow time of 48 seconds (measured as a 70% solution in xylene, DIN 53 211, DIN-cup 4) there are added with stirring in a nitrogen atmosphere and at a temperature of 130° C.

(a) 70.8 g maleic anhydride, and thereafter the mixture is kept at 130° C. for 30 minutes;

(b) 70.8 g maleic anhydride and thereafter 1.77 g N-(N',N'-diethylaminopropyl)maleimide are added;

(c) 0.67 g of a 50% solution of copper napthenate (copper content 10%) in mineral spirit (boiling point 140°/190° C.) are added and 70.8 g of maleic anhydride are added after 30 minutes at 130° C.

The mixtures are then heated to 180° C. within two hours and are kept at this temperature for 11 hours 40 minutes.

I claim:

1. A process for the addition of maleic anhydride to diene polymers with a viscosity of from 400 to 50,000 cP (measured at 30° C.) in the presence of at least one gel-inhibitor, characterised in that a compound is used corresponding to the formula:

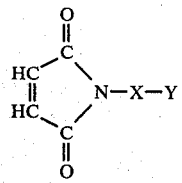

wherein
X represents a divalent aliphatic, cycloaliphatic, aliphatic-cycloaliphatic, aromatic or aliphatic-aromatic group with from 1 to 12 carbon atoms,
Y represents an amino group corresponding to the formula NR$^1$R$^2$ or an ammonium group corresponding to the formula:

N$^\oplus$R$^1$R$^2$R$^3$ Z$^\ominus$

R$^1$,R$^2$ each represents an alkyl group with from 1 to 6 carbon atoms or
R$^1$ and R$^2$ together represent an alkylene group with from 2 to 6 carbon atoms which can additionally also contain a hetero-atom from the series N,S, O,
R$^3$ represents a hydrogen atom, an alkyl group or aralkyl group with from 1 to 18 carbon atoms or the group CH$_2$—CO—NH$_2$,
Z$^\ominus$ represents a monovalent anion, or
R$^3$ and Z$^\ominus$ together represent a group corresponding to the formulae (CH$_2$)$_n$-SO$_3$$^\ominus$ and (CH$_2$)$_m$-CO$_2$$^\ominus$ and n,m represent an integer from 2 to 6.

2. A process according to claim 1, characterised in that the process is carried out at a temperature of from 60° C. to 230° C.

3. A process according to claim 1 or 2, characterised in that the reaction lasts for from 1 to 10 hours.

4. A process according to claim 1, characterised in that the process is carried out in the presence of from 0.001 to 20% by weight, based on diene polymer, of the gel-inhibitor.

5. A process according to claim 1, characterised in that the radical X contains from 2 to 10 carbon atoms.

6. A process according to claim 1, characterised in that the radicals R$^1$, R$^2$ each contains from 1 to 4 carbon atoms.

7. A process according to claim 1, characterised in that R$^1$ and R$^2$ together represent an alkylene radical with from 3 to 5 carbon atoms.

8. A process according to claim 1, characterised in that Z$^\ominus$ represents a chloride bromide or iodide radical.

9. A process according to claim 1, characterised in that n,m each represents 3 or 4.

* * * * *